United States Patent [19]
Johnson

[11] 4,081,942
[45] Apr. 4, 1978

[54] MACHINE AND METHOD FOR FILLING, INTRODUCING STEAM INTO, AND SEALING FLEXIBLE POUCHES

[75] Inventor: Kenneth R. Johnson, Rockford, Ill.

[73] Assignee: Rexham Corporation, New York, N.Y.

[21] Appl. No.: 710,461

[22] Filed: Aug. 2, 1976

[51] Int. Cl.² .............................................. B65B 31/04
[52] U.S. Cl. ...................................... 53/22 B; 53/11; 53/79; 53/112 B; 426/412
[58] Field of Search ................. 53/11, 22 A, 22 B, 86, 53/79, 110, 112 A, 112 B; 426/410, 412

[56] References Cited

U.S. PATENT DOCUMENTS

| | | |
|---|---|---|
| 2,649,674 | 8/1953 | Bartelt .................................... 53/183 |
| 3,200,560 | 8/1965 | Randall ................................... 53/86 |
| 3,289,383 | 12/1966 | Foss ..................................... 53/110 X |
| 3,553,934 | 1/1971 | Johnson et al. ........................ 53/183 |
| 3,619,974 | 11/1971 | Johnson et al. .................... 53/112 B |
| 3,845,606 | 11/1974 | Wilson .............................. 53/22 B X |
| 4,016,705 | 4/1977 | Wilson et al. ...................... 53/112 B |
| 4,027,456 | 6/1977 | Wilson .............................. 53/112 B |

*Primary Examiner*—Travis S. McGehee
*Attorney, Agent, or Firm*—Leydig, Voit, Osann, Mayer & Holt, Ltd.

[57] ABSTRACT

Flexible pouches filled with product are advanced to a steaming station where steam is introduced into the pouches to remove the air therefrom. The pouches are closed and sealed while in the presence of steam and before being advanced out of the steaming station so as to prevent air from re-entering the pouches.

7 Claims, 8 Drawing Figures

MACHINE AND METHOD FOR FILLING, INTRODUCING STEAM INTO, AND SEALING FLEXIBLE POUCHES

BACKGROUND OF THE INVENTION

This invention relates to a packaging machine and to a method of filling flexible pouches with product, introducing steam into the filled pouches to remove the air therefrom, and then sealing the pouches.

In the packaging of certain products, and particularly food products, the filled and sealed pouches are delivered to an autoclave and are heated to high temperatures so as to sterilize the product in the pouches. In order for this packaging process to be successful, it is important that the sealed pouch be substantially free of air when the pouch is delivered to the autoclave. If any significant amount of air is present in the pouch, the air will expand when subjected to the high temperatures in the autoclave and will cause the pouch to balloon, such ballooning sometimes destroying the seals of the pouch. Even if the pouch is not subjected to autoclaving, it is often desirable to remove the air from the pouch so that the product will be packaged in an oxygen-free environment and will possess a long stable shelf life.

One known method of producing substantially air-free pouches is disclosed in Wilson U.S. Pat. No. 3,845,606 in which filled pouches are advanced through a retort containing steam and then are sealed while still in the retort. Another method takes place in ambient atmosphere rather than in a retort and involves the use of a packaging machine of the same general type as disclosed in Bartelt U.S. Pat. No. 2,649,674, a machine of this type being known in the industry under the trademark BARTELT. With such a machine, the pouches are advanced first through a filling station where product is introduced into the pouches. The pouches next are advanced to a steaming station where steam is introduced into the pouches to drive the air out of the pouches. Thereafter, the pouches are advanced out of the steaming station and into a sealing station where the open ends of the pouches are sealed. All operations take place while the pouches are in ambient atmosphere and thus it is not necessary to provide a retort for maintaining an environment of steam.

SUMMARY OF THE INVENTION

The general aim of the present invention is to provide a new and improved packaging method and also a new and improved packaging machine, preferably of the Bartelt-type, in which the pouches are filled with product, flushed with steam and then sealed while in ambient atmosphere and yet are continuously exposed to steam while being sealed so as to prevent the entry of air into the pouches between the time the pouches are flushed and sealed.

A related object is to flush the pouches with steam while the pouches are dwelling in a steaming station and then to immediately close and seal the pouches while the pouches are still dwelling in the steaming station. In this way, the pouches are sealed while in the presence of steam and before the steam in the pouches can condense and draw air back into the pouches. Thus, very little air is present in the sealed pouches.

The invention also resides in the novel means which are used to close, stretch and seal the pouches in a single station.

These and other objects and advantages of the invention will become more apparent from the following detailed description when taken in conjunction with the accompanying drawings.

BRIEF DESCRIPTION OF THE DRAWINGS

FIG. 4a is a fragmentary cross-section taken substantially along the line 4—4 of FIG. 2a.

DETAILED DESCRIPTION OF THE PREFERRED EMBODIMENT

Figure 1:
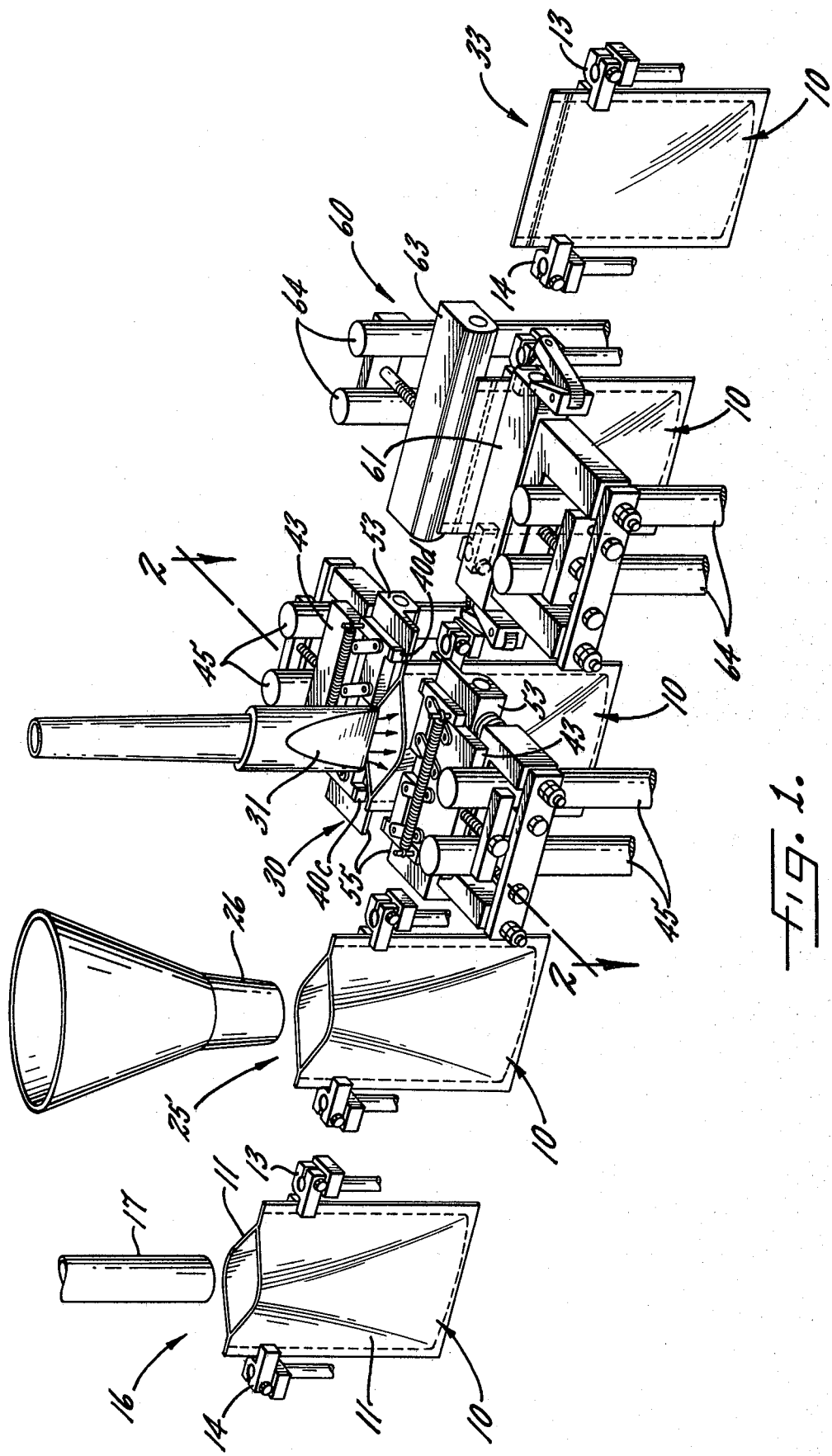
FIG. 1 is a fragmentary perspective view of a new and improved packaging machine incorporating the unique features of the present invention.

As shown in the drawings for purposes of illustration, the invention is embodied in a packaging machine for filling and sealing envelope-type pouches 10. Such a pouch usually is made from a single or composite sheet of flexible material having at least one side which is heat sealable. The pouch includes two flexible panels 11 which are sealed or otherwise joined together along their side and bottom margins, the upper end of the pouch being open until the pouch is filled and sealed.

Figure 2A:
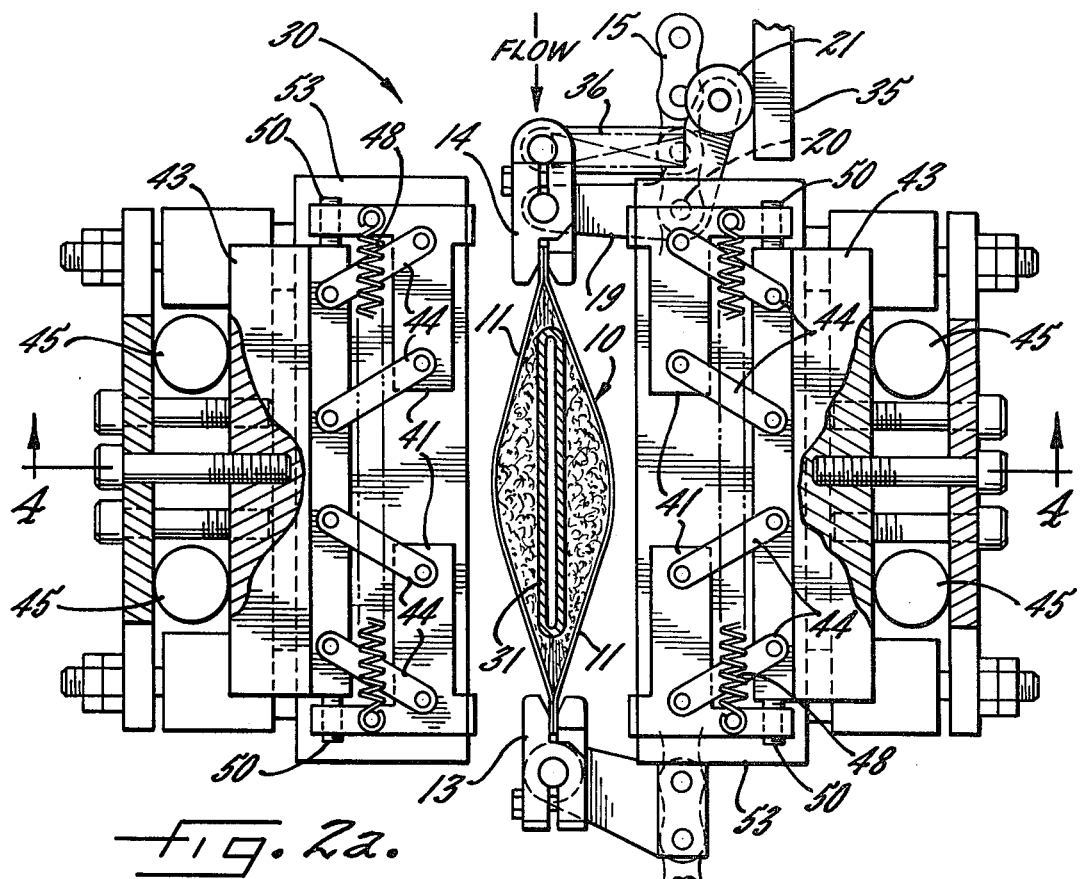
FIG. 2a is an enlarged cross-section taken substantially along the line 2—2 of FIG. 1 and showing certain parts of the machine.

In many respects, the packaging machine is similar to those disclosed in the aforementioned Bartelt patent and in Johnson et al U.S. Pat. No. 3,553,934 and thus certain elements of the machine need not be described in detail. It will suffice to say that each pouch 10 is adapted to be gripped releasably at its side margins by leading and trailing clamps 13 and 14 which are carried on a chain 15 (FIG. 2a). The latter is adapted to be advanced intermittently by a drive mechanism (not shown) and, as the chain is advanced along a predetermined path, the pouches are moved into and momentarily dwell at a series of horizontally spaced stations where packaging operations are performed on the pouches. In the present instance, the pouches are advanced in spaced edgewise relation and are held with their open ends facing upwardly.

Figure 4A:
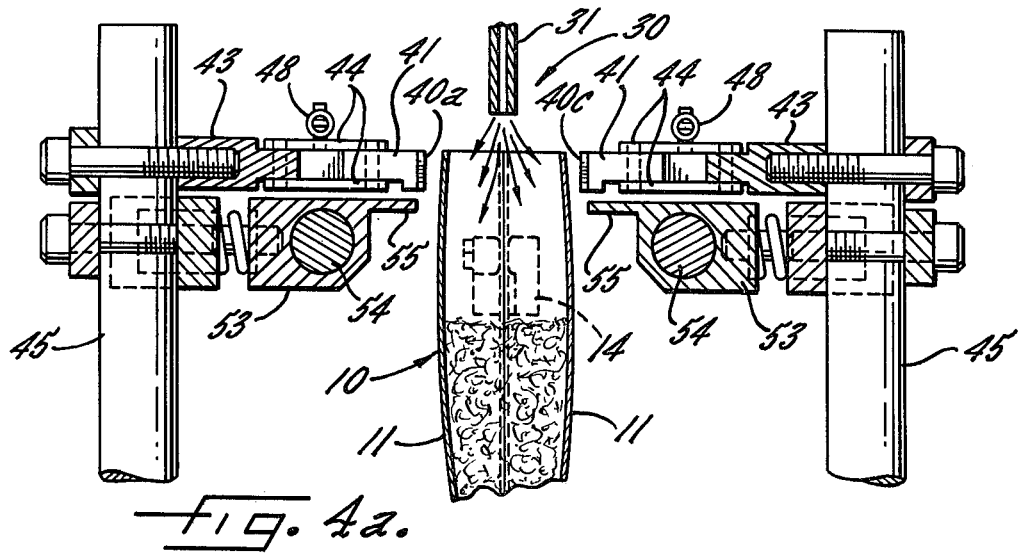

Herein, the machine includes a first filling station 16 having a dispenser spout 17 for depositing a product into each pouch 10 as the latter dwells beneath the spout. In one particular packaging operation, the product which is discharged through the spout is liquid gravy or sauce. To facilitate dispensing of the product into the pouch, the trailing clamp 14 is adapted to be shifted toward the leading clamp 13 and, when the trailing clamp is so shifted, it causes the panels 11 of the pouch to bow outwardly and open the upper end portion or mouth of the pouch as shown in FIGS. 1, 2a and 4a. In order to effect shifting of the trailing clamp 14, the latter is carried on a bellcrank 19 (FIG. 2a) which is pivotally mounted at 20 on the chain 15. When the trailing clamp is located in the filling station 16, a stationary cam (not shown) engages a roller 21 on one arm of the bellcrank 19 and causes the latter to swing counterclockwise about the pivot 20 and thereby shift the trailing clamp toward the leading clamp 13 and effect opening of the pouch. For a more detailed disclosure of a shiftable bag clamp, reference may be had to Lense et al U.S. Pat. No. 3,568,402.

After receiving gravy or sauce at the filling station 16, each pouch 10 is advanced to a second filling station 25 where another product is introduced into the pouch through a spout 26. The product which is dispensed at the second filling station may be a solid product such as chunks of meat or vegetables which have been quick frozen to preserve their flavor and nutrients. Thus, in the present instance, a cold solid product is placed in the pouches at the second filling station. The pouches are held open by the trailing bag clamps 14 during dispensing of the product at the second filling station.

Each filled pouch 10 next advances to a steaming station 30 where dry steam at approximately 450° F. is introduced into the pouch through a nozzle 31 while the upper end of the pouch is still held open by the trailing clamp 14. The steam drives air and gases out of the pouches for a purpose to be explained subsequently. As shown in FIGS. 1, 2a and 4a, the steam nozzle 31 is located just above the upper end of each pouch which dwells in the steaming station 30 and is of a flat and elongated shape so as to discharge the steam across substantially the entire length of the mouth of the pouch.

After each pouch 10 is flushed with steam, its upper end portion is heat sealed and the pouch is advanced to a station 33 for removal from the clamps 13 and 14. The pouch is subsequently transferred to an autoclave (not shown) which is adapted to heat the pouch to high temperatures in order to sterilize the contents of the pouch. Any air which is in the pouch will expand when subjected to the heat of the autoclave and, if any significant amount of air is present in the pouch, it will cause the pouch to balloon and may cause either the panels 11 or the seals to break. Also, the presence of oxygen in the pouch is detrimental to the shelf life of some products. Accordingly, it is important to remove air from the pouch and, in the present instance, this is achieved by introducing steam into the pouch at the steaming station 30. The steam drives most of the air out of the pouch and, upon condensing, creates a vacuum in the sealed pouch.

According to the present invention, more effective use is made of the steam by closing and sealing each pouch 10 while the pouch is still in the steaming station 30 and preferably while steam is still being directed downwardly toward the pouch. By sealing the pouch in the steaming station and in the presence of steam rather than advancing the pouch to a downstream station for sealing, more live steam is captivated in the pouch and there is less danger of the steam condensing and drawing air back into the pouch before the latter is sealed. As a result, the pouch contains less air when the pouch is sealed at the steaming station itself in accordance with the principles of the present invention.

Figure 2B:
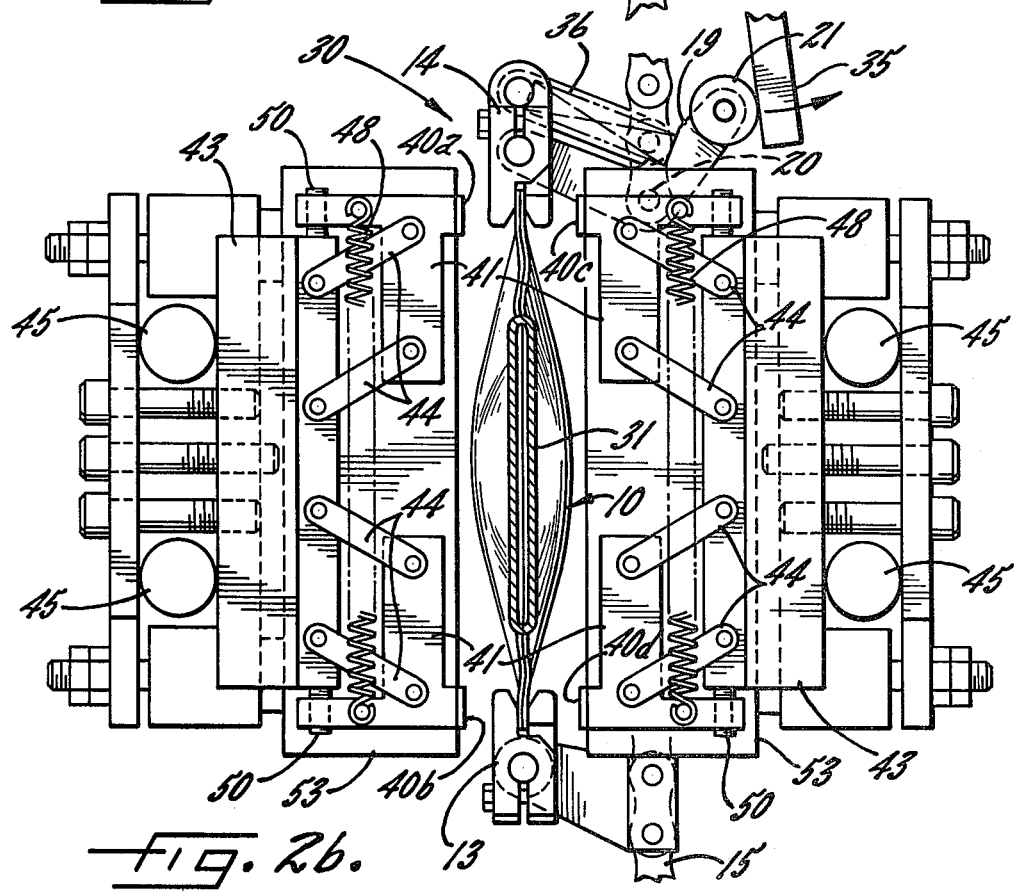
FIGS. 2b and 2c are views similar to FIG. 2a but show the parts in successively moved positions.

In carrying out the invention, the upper end portion of each pouch 10 is first closed, is then stretched and is then heat sealed. These operations all occur while the pouch is dwelling at the steaming station 30 beneath the steam nozzle 31, the steam preferably being discharged continuously from the nozzle and not being interrupted at any time either when the pouch is dwelling or is being advanced. Closing of the pouch is effected shortly after the pouch has initially stopped in the steaming station and has received a charge of steam. To this end, a swingable bar 35 (FIG. 2a) is located adjacent the upstream end of the steaming station. When each pouch first enters the station, the bar is positioned as shown in FIG. 2a and engages the roller 21 of the trailing bag clamp 14 to keep that clamp shifted toward the leading clamp 13 and thus hold the pouch open. After the pouch has stopped in the steaming station for a short interval and has been flushed with steam, the bar 35 is swung counterclockwise to the position shown in FIG. 2b. As an incident to such swinging, a coil spring 36 forces the bellcrank 19 to turn clockwise about the pivot 20, the spring being compressed between the bellcrank and the trailing clamp 14. Clockwise turning of the bellcrank shifts the trailing clamp away from the leading clamp 13 so that the panels 11 of the pouch are drawn toward one another to close the upper end portion of the pouch. When the pouch is closed, the upper margins of the panels are disposed in substantially face-to-face relation as shown in FIG. 2b.

Figure 3:
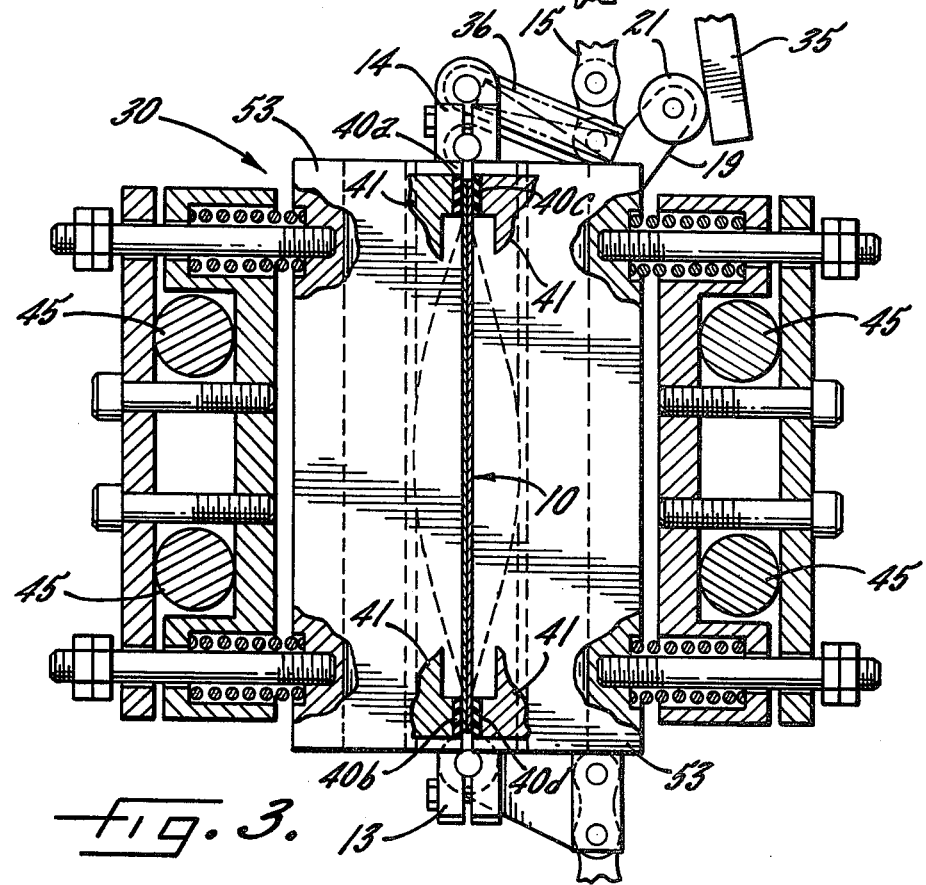
FIG. 3 is a fragmentary cross-sectional view showing the mechanism for sealing the pouches.
Figure 4B:
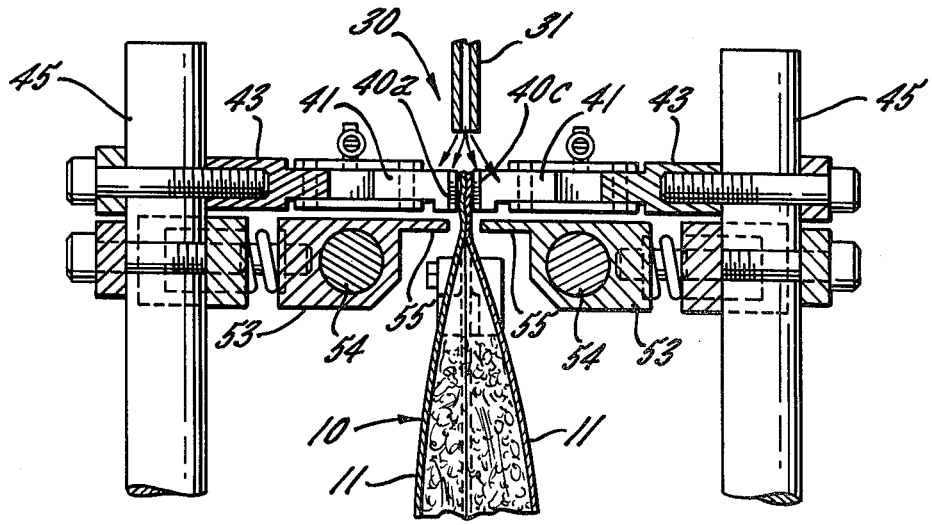
FIG. 4b is a view similar to FIG. 4a but shows the upper end of the pouch being stretched.

While shifting of the trailing clamp 14 away from the leading clamp 13 is effective to close the upper end of the pouch 10, the upper margins of the side panels 11 are not drawn into perfectly flat face-to-face relationship and, in addition, such upper margins may be somewhat wrinkled or wilted as a result of the steam impinging on the flexible material. Accordingly, the upper margins of the panels are stretched preparatory to being heat sealed. For this purpose, the machine includes four stretcher shoes 40a, 40b, and 40c, 40d adapted to engage the opposite sides of the panels 11 adjacent their top and side margins and operable to stretch and flatten the upper portion of the pouch. As shown in FIGS. 3 and 4b, each shoe is in the form of a small rubber pad which is attached to a generally L-shaped mounting element 41. The shoes 40a and 40b are located on one side of the pouch 10 and are positioned adjacent opposite side margins of the pouch and just above the clamps 13 and 14. The shoes 40c and 40d are located on the opposite side of the pouch and directly oppose the shoes 40a and 40b, respectively.

The mounting element 41 for each stretcher shoe 40 is connected to a support bar 43 by a pair of pivoted, parallel links 44, the mounting elements for the shoes 40a and 40b being connected to a support bar on one side of the pouch and the mounting element for the shoes 40c and 40d being connected to a support bar on the other side of the pouch. Each support bar, in turn, is clamped to a pair of upright rods 45 which are adapted to be swung toward and away from the pouch by conventional mechanism such as shown in FIG. 21 of the aforementioned Johnson et al patent.

When the pouch 10 is being advanced into the steaming station 30 and until after closing of the pouch by the trailing clamp 14, the rods 45 are in retracted positions as shown in FIGS. 2a and 4a. With the rods in this position, the stretcher shoes 40 are retracted away from one another and the pouch so as to allow the open pouch to move into and occupy the steaming station. When the shoes are in their retracted positions, contractile springs 48 (FIG. 2a) urge the shoe 40a toward the shoe 40b and urge the shoe 40c toward the shoe 40d, there being one spring connected between the mounting elements 41 for the shoes 40a and 40b and another spring connected between the mounting elements for the shoes 40c and 40d. Stop screws 50 on the mounting elements engage the ends of the support bars 43 to limit the extent to which the springs may pull the shoes toward one another.

Figure 2C:
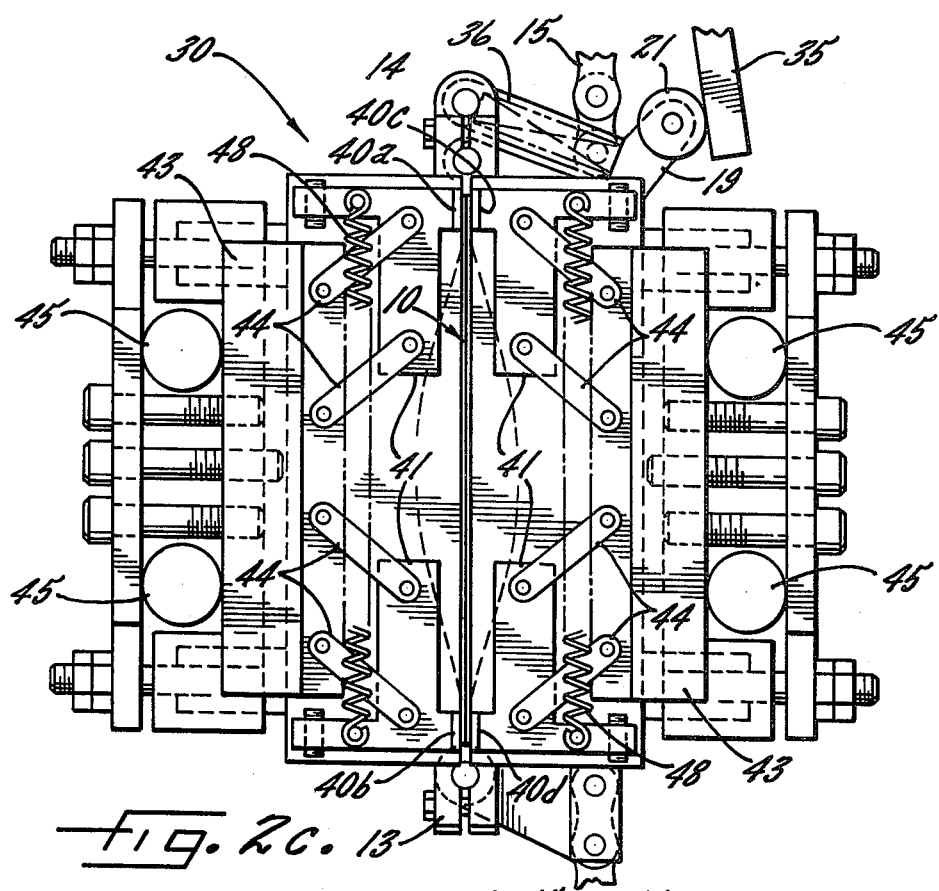
Figure 4C:
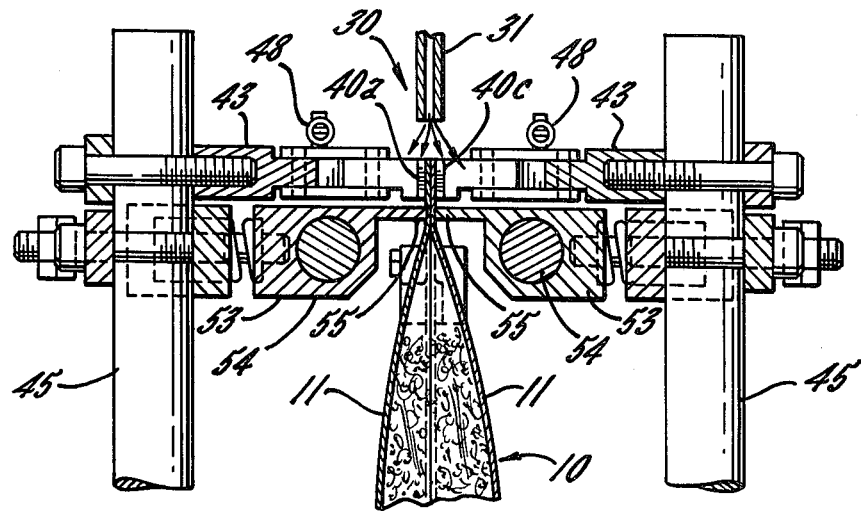
FIG. 4c is a view similar to FIG. 4a but shows the upper portion of the pouch being sealed.

Immediately after the pouch 10 is closed by the trailing clamp 14, the rods 45 are swung toward one another as shown in FIGS. 2c and 4b. As an incident thereto, the shoes 40a and 40c engage and press against one side margin of the pouch while the shoes 40b and 40d engage and press against the other side margin. As a result of the force created by the shoes 40a and 40c and the shoes 40b and 40d pressing against one another, the links 44 pivot and cause the shoes 40a and 40c to shift rearwardly and the shoes 40b and 40d to shift forwardly. With the upper margin of the pouch clamped between the opposing shoes, such shifting causes the upper margin to be stretched into a substantially flat and wrinkle-free condition as shown in FIGS. 3 and 4c.

In keeping with the invention, the upper margin of the pouch 10 is heat sealed just after being stretched and while steam is still being directed downwardly toward the pouch in the steaming station 30. To seal the pouch, a pair of opposed sealing bars 53 (FIG. 4a) are carried on the rods 45 just below the support bars 43 and are disposed on opposite sides of the pouch. The sealing bars are equipped with heating elements 54 and are formed with narrow sealing shoes 55 located just below the stretcher shoes 40 and having a width corresponding to the width of the pouch. When the stretcher shoes 40 first engage the pouch, the sealing shoes 55 are spaced slightly from the pouch as shown in FIG. 4b. But, as the links 44 pivot and the stretcher shoes move forwardly and rearwardly to stretch the pouch—and with continued inward swinging of the rods 45—the sealing shoes 55 engage opposite sides of the pouch as shown in FIG. 4c and form a heat seal extending along the upper end portion of the pouch across the full width thereof. The rods 45 then are swung outwardly to retract the stretcher shoes 40 and the sealing shoes 55 away from the pouch so that the latter may be advanced out of the steaming station 30.

The seal effected by the sealing shoes 55 is made at comparatively high speed and may not be sufficiently reliable to serve as the final top seal for the pouch 10. This seal does, however, intimately join the upper margins of the side panels 11 and prevents steam from escaping out of and air from entering into the pouch. Importantly, this seal is made while steam is still being directed toward the pouch. Thus, the seal is effected before the steam in the pouch can condense and create a vacuum to draw air into the pouch as would occur if the pouch were advanced out of the steaming station in an unsealed condition. Formation of the seal in the steaming station is even more important where—as here—some of the product in the pouch is very cold. The cold product tends to accelerate condensation of the steam and, when the pouch is not sealed in the steaming station itself, the vacuum resulting from such condensation can draw air back into the pouch before the pouch can be sealed at a downstream station. Accordingly, the present invention results in the presence of less air in the pouch since the seal is established after steam is introduced into the pouch and before there is any significant condensation of the steam.

After being advanced out of the steaming station 30, the pouch 10 is shifted into a final sealing station 60 (FIG. 1) before being transferred to the discharge station 33 and the autoclave. When the pouch dwells at the final sealing station 60, a good quality top seal is formed by a conventional impulse sealer comprising a sealing bar 61 and a backing bar 63, both bars being carried on swingable rods 64 similar to the rods 45. The impulse seal which is thus formed improves the integrity of the seal made at the steaming station 30 and keeps the pouch tightly sealed until such time as the pouch is opened for removal of the product.

From the foregoing, it will be apparent that the present invention effects closing and sealing of the pouch 10 while the latter is in the steaming station 30 and thus the sealed pouch contains only a relatively small amount of air. While the invention has been specifically disclosed in connection with a packaging machine in which the pouches are advanced intermittently, those familiar with the art will appreciate that the principles of the invention could be applied to a continuous motion machine. Also, it should be appreciated that the present invention achieves effective steaming of the pouches and yet enables filling and sealing of the pouches while the pouches are being advanced through the ambient atmosphere. Accordingly, it is not necessary to place the pouches in either a steam or vacuum retort to remove the air.

I claim:

1. A packaging machine for filling, steaming and sealing flexible pouches, said machine comprising mechanism for intermittently advancing the pouches edgewise and open end up along a predetermined path and in ambient atmosphere through spaced filling and steaming stations with each pouch dwelling first in said filling station and then in said steaming station, a dispenser in said filling station for introducing product into each pouch while the latter dwells in said filling station, a nozzle located in said steaming station and above said path for introducing steam into each pouch while the latter dwells in said steaming station and beneath said nozzle, means for holding the upper end portion of each pouch in an open position as the pouch is being advanced into said steaming station and while the pouch initially dwells beneath said nozzle thereby to enable the introduction of said steam into said pouch, means for moving the upper end portion of each pouch to a closed position while the pouch is still dwelling beneath said nozzle, means in said steaming station for stretching the upper end portion of each pouch after said upper end portion has been closed and while the pouch is still dwelling beneath said nozzle, and means in said steaming station for sealing the closed and stretched upper end portion of each pouch before the pouch is advanced from beneath said nozzle thereby to prevent the introduction of air into the pouch.

2. A packaging machine as defined in claim 1 in which said sealing means includes a first pair of shoes and in which said stretching means includes a second pair of shoes, one shoe of each pair being disposed on one side of said path and the other shoe of each pair being disposed on the opposite side of said path, each of said stretching shoes being movable toward said pouch in unison with one of said sealing shoes and engaging said pouch prior to engagement of the pouch by said sealing shoe, and each stretching shoe thereafter moving relative to said sealing shoe in the direction of said path.

3. A method of filling, steaming and sealing flexible pouches, said method comprising the steps of advancing the pouches edgewise and open end up along a predetermined path and in ambient atmosphere through spaced filling and steaming stations, stopping each pouch first in said filling station and then in said steaming station, holding the upper end portion of each pouch in an open position while the pouch dwells in said filling station, as the pouch is being advanced from the filling station to the steaming station and while the pouch initially dwells in said steaming station, introducing product into each pouch while the pouch is dwelling in said filling station with its upper end portion held in an open position, introducing steam into each pouch through a nozzle while the pouch is initially dwelling in said steaming station and beneath said nozzle with the upper end portion of the pouch held in an open position, moving the upper end portion of each pouch to a closed position after steam has been introduced into the pouch and while the pouch is still dwelling beneath said nozzle, stretching the upper end portion of each pouch in said steaming station after said upper end portion has been closed and while the pouch is still dwelling beneath said nozzle, and sealing the closed and stretched upper end portion of each pouch before the pouch is advanced from beneath said nozzle thereby to prevent the introduction of air into the pouch.

4. A method as defined in claim 3 in which steam is directed toward each pouch at all times while the pouch is being closed stretched and sealed.

5. A method of filling, steaming, closing and sealing pouches each defined by two face-to-face flexible panels, said method comprising the steps of advancing the pouches edgewise and open end up along a predetermined path and in ambient atmosphere through spaced filling and steaming stations, stopping each pouch first in said filling station and then in said steaming station, keeping the panels of each pouch spread away from one another to hold the upper end portion of the pouch in a widely open position while the pouch dwells in said filling station, as the pouch is being advanced from the filling station to the steaming station and while the pouch initially dwells in said steaming station, introducing product into each pouch while the pouch is dwelling in said filling station with its upper end portion held in said widely open position, introducing steam into each pouch through a nozzle while the pouch is initially dwelling in said steaming station and beneath said nozzle with the upper end portion of the pouch held in said widely open position, moving the panels of each pouch toward one another to move the upper end portion of the pouch to a closed position while directing steam toward the pouch and while the pouch is still dwelling beneath said nozzle, and sealing the upper end portion of each pouch after the pouch has been closed and before the pouch is advanced from beneath said nozzle thereby to prevent the introduction of air into the pouch.

6. A packaging machine for filling, steaming, closing and sealing pouches each defined by two face-to-face flexible panels, said machine comprising mechanism for intermittently advancing the pouches edgewise and open end up along a predetermined path and in ambient atmosphere through spaced filling and steaming stations with each pouch dwelling first in said filling station and then in said steaming station, a dispenser in said filling station for introducing product into each pouch while the latter dwells in said filling station, a nozzle located in said steaming station and above said path for introducing steam into each pouch while the latter initially dwells in said steaming station and beneath said nozzle and for directing steam toward the pouch during the remainder of the dwell period, means for keeping the panels of each pouch spread away from one another to hold the upper end portion of the pouch in a widely open position as the pouch is being advanced into said steaming station and while the pouch initially dwells beneath said nozzle thereby to enable the introduction of said steam into said pouch, means for causing the panels of each pouch to move toward one another to move the upper end portion of the pouch to a closed position while the pouch is still dwelling beneath said nozzle and before the pouch is sealed, and means in said steaming station for sealing the upper end portion of each pouch after the pouch has been closed and before the pouch is advanced from beneath said nozzle thereby to prevent the introduction of air into the pouch.

7. A packaging machine as defined in claim 6 in which said means for holding the upper end portion of each pouch in an open position comprise clamps which grip the leading and trailing edges of the pouch, said means for causing the upper end of the pouch to move to said closed position comprising mechanism located in said steaming station for shifting one of said clamps along said path and away from the other of said clamps while the pouch is dwelling.

* * * * *